US010112412B2

(12) United States Patent
Herrmann et al.

(10) Patent No.: US 10,112,412 B2
(45) Date of Patent: Oct. 30, 2018

(54) OBJECT HOLDER FOR A DIRECT-TO-OBJECT PRINTER

(71) Applicant: Xerox Corporation, Norwalk, CT (US)

(72) Inventors: Douglas K. Herrmann, Webster, NY (US); Jason Lefevre, Penfield, NY (US); Chu-Heng Liu, Penfield, NY (US); Paul McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/477,292

(22) Filed: Apr. 3, 2017

(65) Prior Publication Data

US 2018/0281462 A1 Oct. 4, 2018

(51) Int. Cl.

| | |
|---|---|
| ***B41J 3/407*** | (2006.01) |
| ***B41M 1/40*** | (2006.01) |
| ***G06K 7/10*** | (2006.01) |
| ***G06K 19/07*** | (2006.01) |
| ***G06K 19/06*** | (2006.01) |

(52) U.S. Cl.

CPC .............. *B41J 3/4073* (2013.01); *B41M 1/40* (2013.01); *G06K 7/10366* (2013.01); *G06K 19/06028* (2013.01); *G06K 19/0723* (2013.01)

(58) Field of Classification Search

CPC ................................ B41M 1/40; B41J 3/4073

See application file for complete search history.

(56) References Cited

U.S. PATENT DOCUMENTS

| | | | | |
|---|---|---|---|---|
| 3,580,772 A * | 5/1971 | Ochoa | A63B 45/02 | 156/240 |
| 6,524,419 B1 * | 2/2003 | Dabrowski, Jr. | A63B 45/02 | 156/230 |
| 2005/0081725 A1 * | 4/2005 | Gelbart | B41F 17/22 | 101/36 |
| 2015/0037593 A1 * | 2/2015 | Chan | B32B 37/12 | 428/426 |
| 2016/0200090 A1 * | 7/2016 | Fuqua | B41M 1/12 | 101/126 |

OTHER PUBLICATIONS

U.S. Appl. No. 15/163,880, filed May 25, 2016.

(Continued)

*Primary Examiner* — Julian Huffman

(74) *Attorney, Agent, or Firm* — Philip E. Blair; Fleit Gibbons Gutman Bongini & Bianco P.L.

(57) ABSTRACT

What is disclosed is an object holder for securely retaining an object while it is being printed in a direct-to-object print system and a direct-to-object print system configured to use various embodiments of the object holder of the present invention. In one embodiment, the object holder comprises a back support configured to slideably traverse a support member positioned parallel to a plane formed by at least one printhead configured to eject marking material on to a surface of an object A top and bottom arm are attached to the back support. At least two support braces are attached to the top and bottom arms. At least one restraining bar is slideably attached to the support braces such that the bar can be raised or lowered on to the object seated between the top and bottom arms. The bar physically retains the object while the object is being printed.

29 Claims, 10 Drawing Sheets

(56) References Cited

OTHER PUBLICATIONS

U.S. Appl. No. 15/477,631, filed Apr. 3, 2017.
U.S. Appl. No. 15/477,580, filed Apr. 3, 2017.
U.S. Appl. No. 15/477,502, filed Apr. 3, 2017.
U.S. Appl. No. 15/477,448, filed Apr. 3, 2017.
U.S. Appl. No. 15/477,404, filed Apr. 3, 2017.
U.S. Appl. No. 15/477,375, filed Apr. 3, 2017.
U.S. Appl. No. 15/477,181, filed Apr. 3, 2017.
U.S. Appl. No. 15/477,198, filed Apr. 3, 2017.
U.S. Appl. No. 15/582,817, filed May 1, 2017.
U.S. Appl. No. 15/621,450, filed Jun. 13, 2017.

* cited by examiner

OBJECT HOLDER FOR A DIRECT-TO-OBJECT PRINTER

TECHNICAL FIELD

The present invention is directed to a printing system for depositing ink directly on to a surface of an object and, more particular, to a device which securely retains an object in the direct-to-object print system while the object is being printed on.

BACKGROUND

Printers known in the document reproduction arts apply a marking material, such as ink or toner, onto a sheet of paper. To print something on an object that has a non-negligible depth such as a coffee cup, bottle, and the like, typically a label is printed and the printed label is applied to the surface of the object. However, in some manufacturing and production environments, it is desirable to print directly on the object itself but this poses a diverse set of hurdles which must be overcome before such specialized direct-to-object print systems become more widely accepted in commerce. One of these hurdles is how to secure the object in such a specialized printer while the object is being printed. Such direct-to-object print systems have a component often referred to as an object holder. The present invention is specifically directed to an object holder for use in a direct-to-object print system designed to print directly on a surface of an object.

BRIEF SUMMARY

What is disclosed is an object holder for securely retaining an object while it is being printed in a direct-to-object print system. In one embodiment, the object holder comprises a back support configured to slideably traverse a support member positioned parallel to a plane formed by at least one printhead configured to eject marking material on to a surface of an object A top and bottom arm are attached to the back support. At least two support braces are attached to the top and bottom arms. At least one restraining bar is slideably attached to the support braces such that the bar can be raised or lowered on to the object seated between the top and bottom arms. The bar physically retains the object while the object is being printed.

What is also disclosed is a direct-to-object print system configured to use various embodiments of the object holder of the present invention. In one embodiment, the direct-to-object print system incorporates at least one printhead configured to eject marking material such as ink. An object holder configured to slideably traverse a support member positioned to be parallel to a plane formed by the printhead. An actuator that operatively causes the object holder to move the object along the support member in to proximity of the printhead. A controller which causes the printhead to eject marking material on to the object held by the object holder as the object moves past the printhead.

Features and advantages of the above-described apparatus and direct-to-object print system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is an object holder for securely retaining an object in a direct-to-object print system, and a direct-to-object print system configured to operatively use various embodiments of the object holder of the present invention.

Non-Limiting Definitions

An "object" has at least one surface thereof to be printed with ink. Example objects are sports equipment and paraphernalia, golf clubs and balls, commemorative gifts, coffee cups, to name a few.

A "direct-to-object print system" or simply "print system" is a printer designed to print on a surface of an object. The direct-to-object print system of FIG. 1 incorporates at least the following functional components: at least one printhead, a support member, an actuator, a controller, and an object holder.

A "printhead" or "print head" is an element (such as an inkjet) which emits or ejects a droplet of marking material such as ink on to a surface of an object thereby making a mark on that object. In one embodiment, the direct-to-object print system has a plurality of monochrome printheads and a UV cure lamp. The print zone is a width of a single M-series printhead (~4 inches). Each printhead is fluidly connected to a supply of marking material (not shown). Some or all of the printheads may be connected to the same supply. Each printhead can be connected to its own supply so each printhead ejects a different marking material. A 10×1 array of printheads is shown at 104 of FIG. 1.

Figure 1:
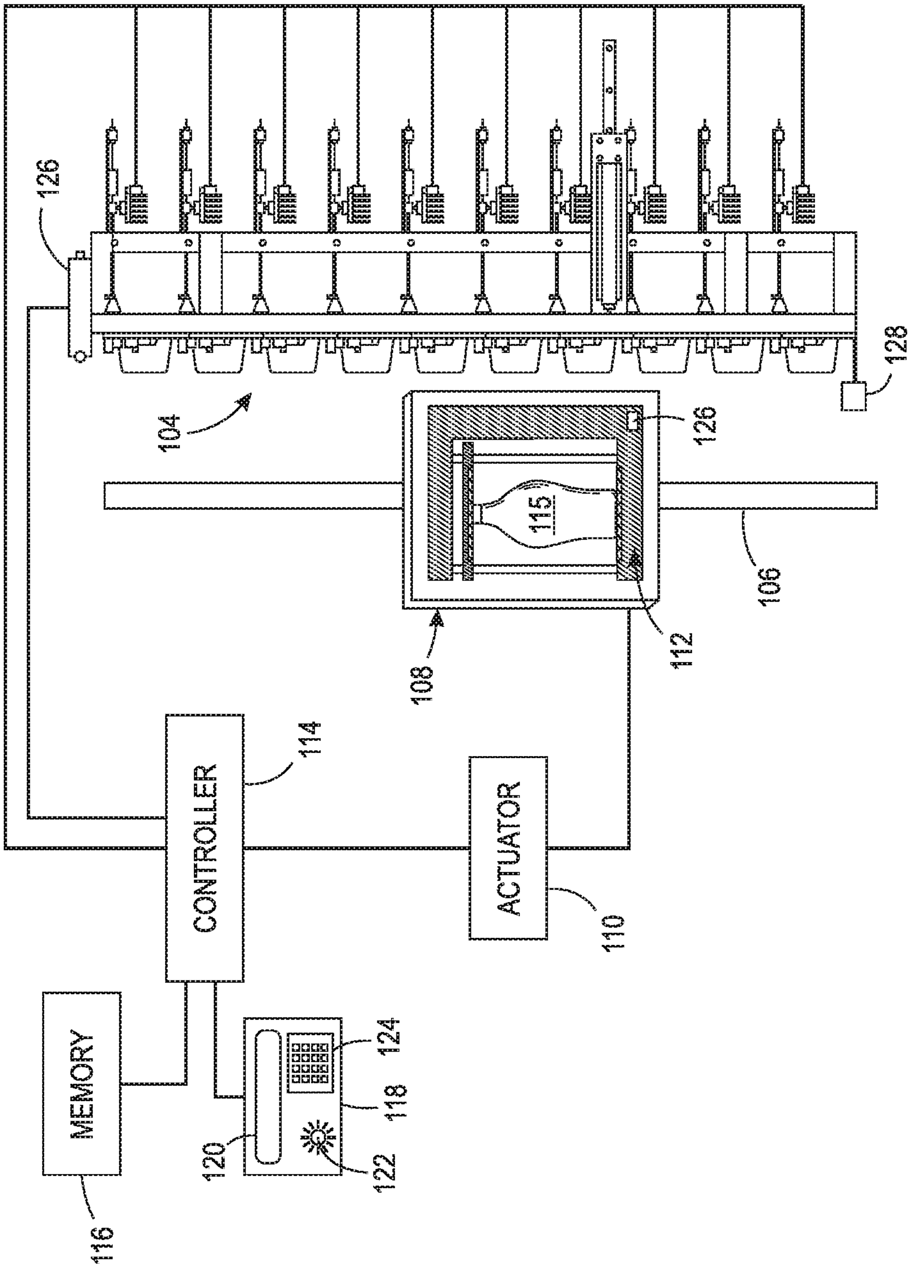
FIG. 1 illustrates one example embodiment of the direct-to-object print system disclosed herein.

A "support member", at 106 of FIG. 1, is positioned to be parallel to a plane formed by the printheads and is oriented so that one end of the support member is at a higher gravitational potential than the other end of the support member. The vertical configuration of the printheads and the support member enables the present direct-to-object print system to have a smaller footprint than a system configured with a horizontal orientation of the printheads and support member. In an alternative embodiment, a horizontal configuration orients the printheads such that the object holder moves an object past the horizontally arranged printheads.

An "actuator", at 110 of FIG. 1, is an electro-mechanical device that causes the object holder to slideably traverse the support member. In one embodiment, a controller causes the actuator to move an object holder at speeds that attenuate the air turbulence in a gap between the printhead and the surface of the object being printed.

An "object holder", at 112 of FIG. 1, physically restrains an object, such as bottle 115, while the object holder is moving along the support member 106 so that the object can pass the printhead. In one embodiment, the object holder is attached to a shuttle mount 108 configured to slideably traverse the support member.

A "controller", at 114 of FIG. 1, is a processor or ASIC which controls various components of the present direct-to-object print system. The controller is configured to retrieve machine readable program instructions from memory 116 which, when executed, configure the controller to signal or otherwise operate the actuator 110 to move the object holder past the printheads. When other retrieved instructions are executed, the controller is configured to signal, or otherwise operate the printheads to start/stop ejecting marking material at a precise time and at a desired location on a surface of the object retained by the object holder. The controller may be further configured to operate the various printheads such that individual printheads eject different size droplets of marking material. The controller may be configured to communicate with a user interface.

A "user interface", at 118 of FIG. 1, generally comprises a display 120 such as a touchscreen, monitor, or LCD device for presenting visual information to a user, an annunciator 122 which emits an audible sound, and an input device 124 such as a keypad for receiving a user input or selection. The controller can be configured to operate the user interface to notify an operator of a failure. The controller monitors the system to detect the configuration of the printheads in the system and the inks being supplied to the printheads. If the inks or the printhead configuration is unable to print the objects accurately and appropriately then a message is presented to the user on the display of the user interface that, for example, inks need to be changed or that the printheads needs to be reconfigured. The controller can be configured to use the annunciator of the user interface to inform the operator of a system status and to attract attention to fault conditions and displayed messages. The user interface may further include a warning light.

An "identification tag", at 126 of FIG. 1, is a machine-readable indicia that is attached to the object holder. The identification tag embodies an identifier that is readable or otherwise receivable by an input device such as sensor 128. The identifier contains information about the object being printed and/or the location of the object as it traverses the support member. The received identifier is, in turn, communicated to the controller. The identification tag can be, for example, a radio frequency identification (RFID) tag with the input device being a RFID reader. The identification tag can also be a barcode with the input device being a barcode reader. In another embodiment, the identification tag comprises one or more protrusions, indentations, or combinations thereof in the object or object holder can be detected or otherwise read by a biased arm which follows a surface of an area comprising the identification tag. In this embodiment, the biased arm is a cam follower that converts the detected protrusions, indentations, and the like position of the mechanical indicia comprising the identification tag into electrical signals which, in turn, are communicated to the controller for processing. In other embodiments, the identification tag comprises optical or electromagnetic indicia. The controller compares the identifier received from the input device to various identifiers stored in memory 116. The controller can disable operation of the actuator and/or the operation of the printheads in response to the received identifier failing to correspond to an identifier stored in the memory. The controller can also be configured to use the user interface to inform the operator of processing that needs to be performed. For example, an identification tag may indicate that an object in the object holder requires special treatment such as pre-coating prior to printing or post-coating after the object is printed. A location of the identification tag or a failure to detect an identification tag may indicate to the controller that the object held by the object holder is misaligned, has come loose, or is absent altogether. The controller, in these examples, would communicate a message to the display 120 regarding the detected condition(s).

A "sensor", at 128 of FIG. 1, is a device such as a digital camera or other imaging device positioned to generate image data by imaging, for example, a sheet of printed media with a test pattern. The controller is configured to receive the image data from the sensor and analyze the image data to identify printhead alignment, image quality, and other maintenance issues such as inoperative ejectors, low ink supply, or poor ink quality. The controller uses the user interface to notify the operation such that the operator is able to understand the reason why the controller disabled of the direct-to-object print system.

Embodiments of Object Holders

Figure 2:
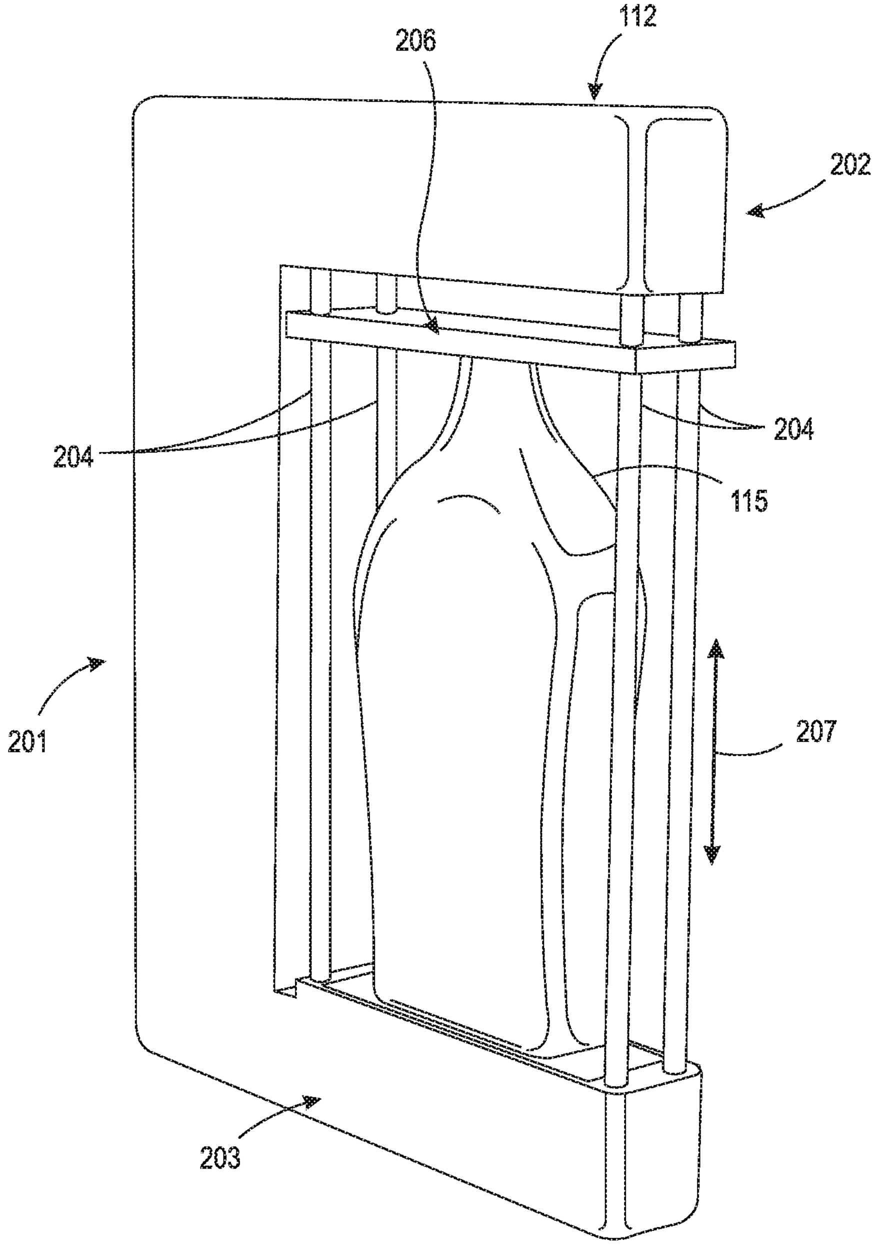
FIG. 2 shows one embodiment of the present object holder for retaining an object in a direct-to-object print system.

Reference is now being made to FIG. 2 which shows one embodiment of the present object holder for securely retaining an object while it is being printed in a direct-to-object print system. The object holder 112 has a back support 201 configured to slideably traverse the support member 106. A top arm 202 and bottom arm 203 are attached to the back support. The object holder is further configured with four support braces at 204A-D. Each brace is attached to the top and bottom arms 202 and 203, respectively. At least one restraining bar 206 is slideably attached to the support braces such that the bar can be raised or lowered (at 207) on to the object 115 which is shown seated between the top and bottom arms. The bar physically retains the object to the object holder. Elastomeric pads, or other material, on the bar and/or the bottom arm may be utilized to help support the object in the object holder.

Figure 3:
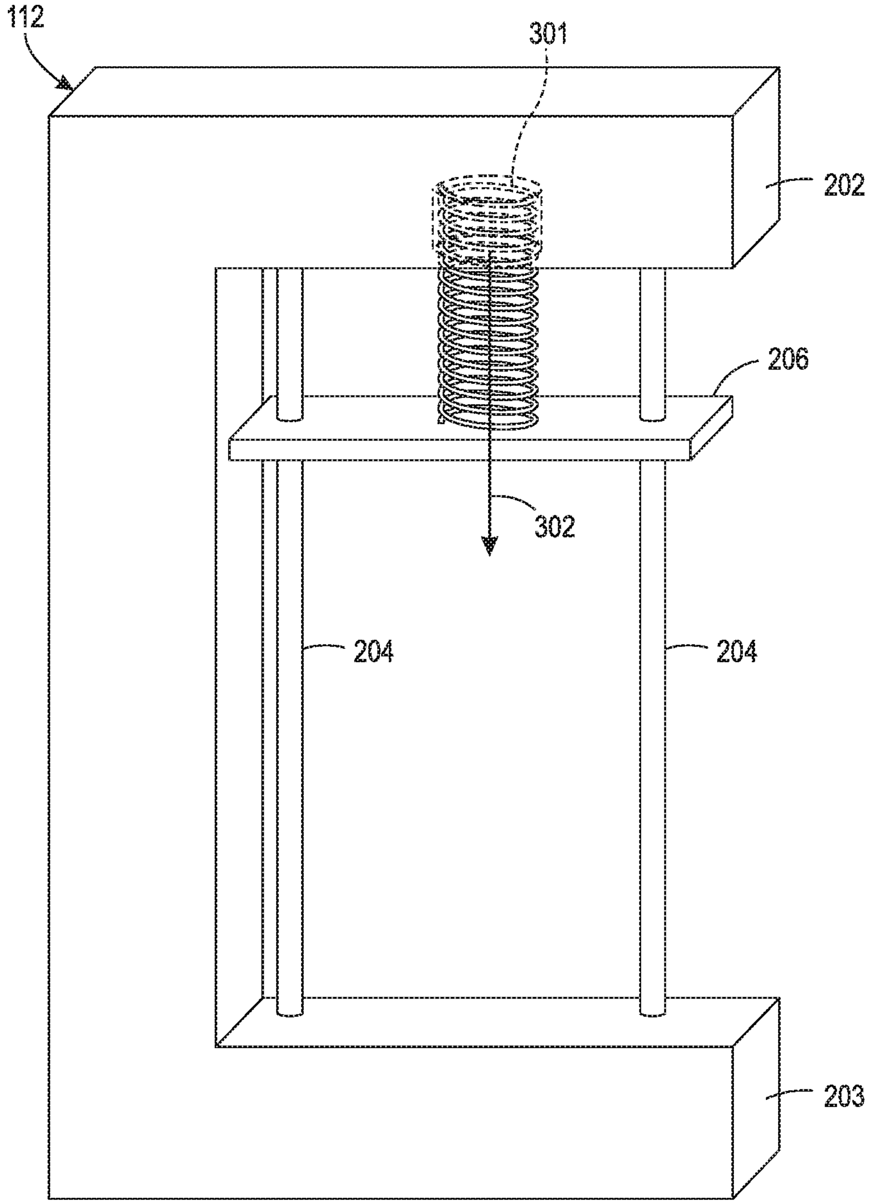
FIG. 3 shows an embodiment of the object holder of FIG. 2 wherein at least one spring is attached at one end to the top arm and attached at an opposite end to the restraining bar to exert a downward tension to help hold the object.

Reference is now being made to FIG. 3 which shows another embodiment of the object holder of FIG. 2 wherein at least one spring is attached at one end to the top arm and attached at an opposite end to the restraining bar. In this embodiment, spring 301 is attached to the top arm 202 and to the restraining bar 206. The spring exerts a tension (at 302) on the restraining bar to help secure an object (not shown) in the object holder.

Figure 4:
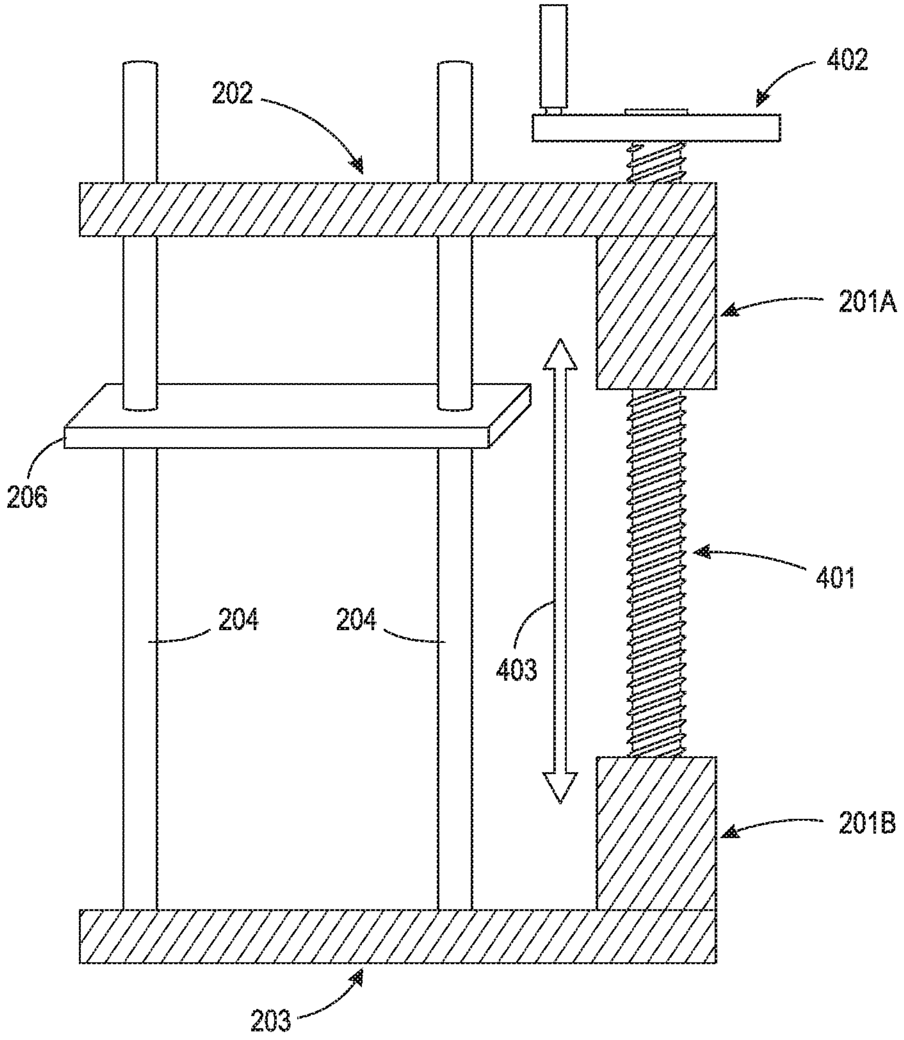
FIG. 4 shows another embodiment of the object holder of FIG. 2 wherein a threaded shaft selectively adjusts a distance between the top and bottom arms to accommodate objects of different sizes.

Reference is now being made to FIG. 4 which shows another embodiment of the object holder of FIG. 2 wherein a threaded shaft selectively adjusts a distance between the top and bottom arms to accommodate objects of different sizes. In this embodiment, the threaded shaft 401 is rotated by a handle 402. The shaft threads through a top portion 201A of the back support 201 and into a bottom portion 201B of the back support. By selectively rotating the handle, a distance (at 403) between the top and bottom arms can be changed to fit larger or smaller objects. A bottom end of the two support braces 204 is fixed to the bottom arm 203 while a top end of the two support braces passes slideably through the top arm 202 so that the support braces self-adjust as the distance between the top and bottom arms changes.

Figure 5A:
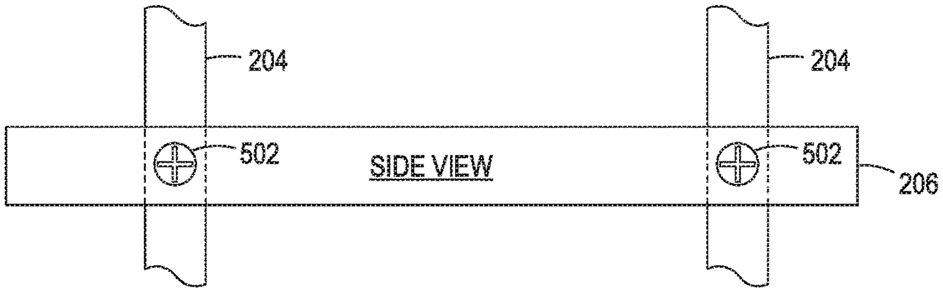
FIGS. 5A and 5B shows a side view and a top view, respectively, of the restraining bar of FIG. 2 wherein a plurality of set screws are utilized to secure a position of the restraining bar to the support braces.
Figure 5B:
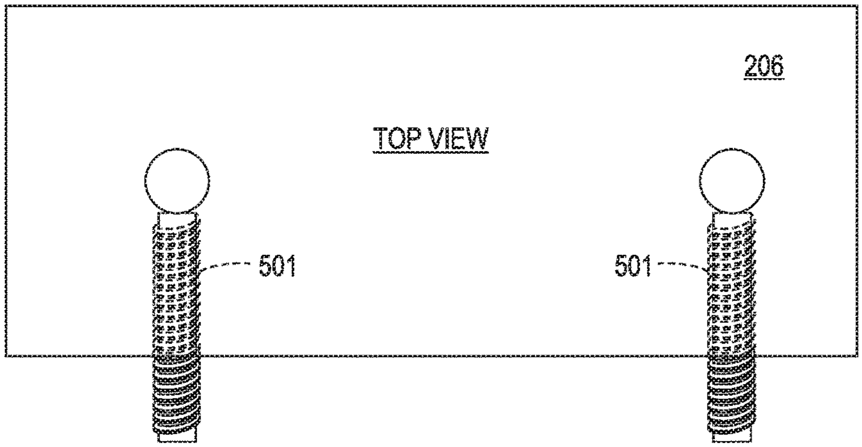

Reference is now being made to FIGS. 5A and 5B show a side view and a top view, respectively, of the restraining bar of FIG. 2 wherein a plurality of set screws are utilized to secure a position of the restraining bar to the support braces. In this embodiment, the restraining bar 206 has threaded set screws 501 each with a Phillips-head which can be selectively tightened using a Phillips-head screwdriver. When the set screws are each tightened, the shaft of each screw presses firmly against a respective support brace thereby locking the restraining bar into its current position. It should be appreciated that the embodiment shown is only one configuration and other configurations of various threaded shafts with different heads including those with a rotatable handle can alternatively be utilized in a similar manner. Such configurations are intended to fall within the scope of the appended claims.

Figure 6:
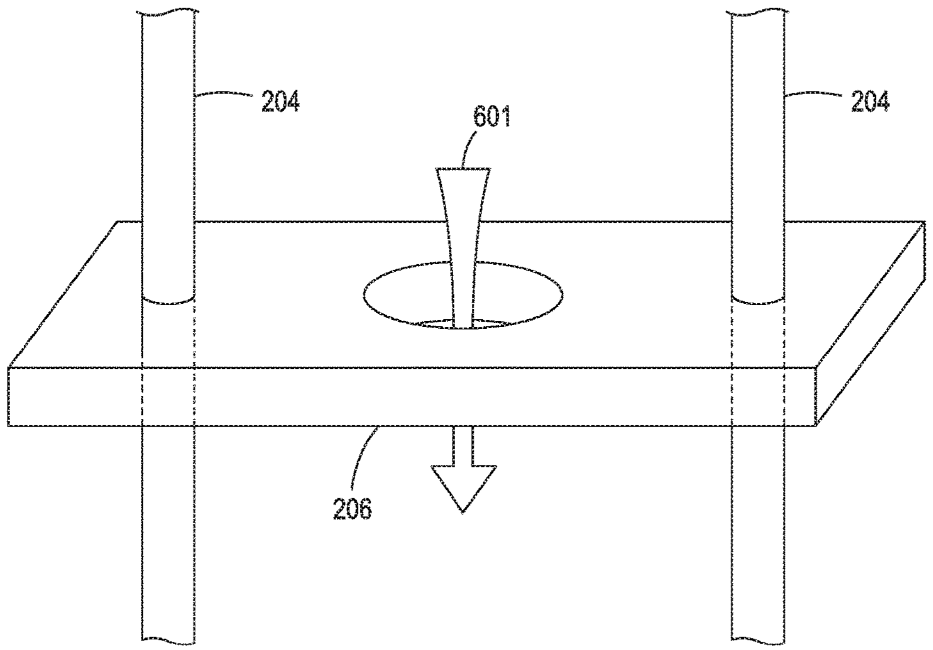
FIG. 6 shows an embodiment of the restraining bar of FIG. 2 wherein the restraining bar is shaped to conform to one end of the object being held in the object holder.

Reference is now being made to FIG. 6 which shows an embodiment of the restraining bar of FIG. 2 wherein the restraining bar is shaped to conform to one end of the object being held in the object holder. In this embodiment, the restraining bar is configured with a hole. As the restraining bar of FIG. 2 is lowered onto the bottle 115 of FIG. 1, for example, the hole passes down (at 601) over the neck of the bottle to help secure the bottle to the object holder. It should be appreciated that the embodiment shown is only one configuration and other configurations of variously shaped restraining bars can alternatively be used. Such alternative embodiments are intended to fall within the scope of the appended claims.

Figure 7:
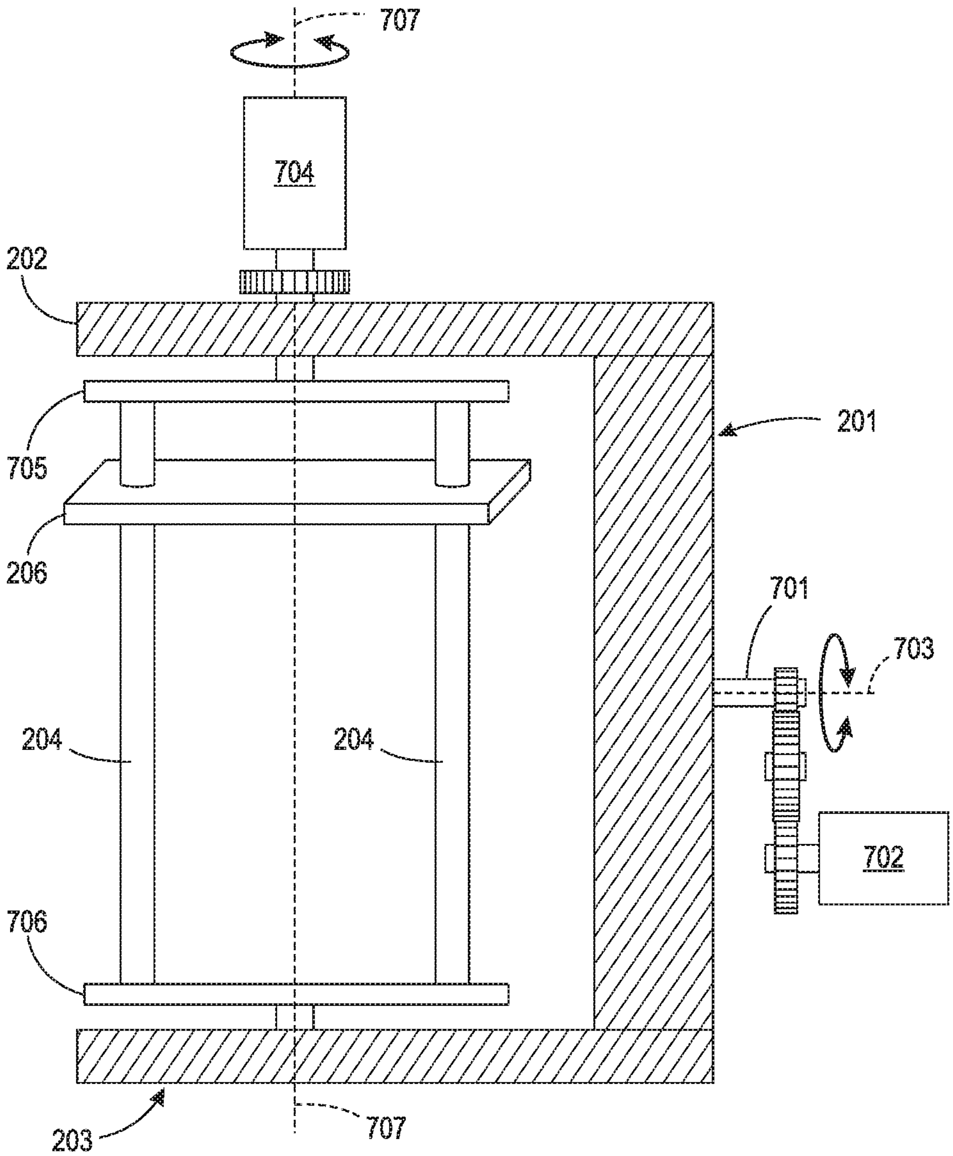
FIG. 7 shows an embodiment of the object holder of FIG. 2 wherein a motor rotates the object in the object holder.

Reference is now being made to FIG. 7 which shows an embodiment of the present object holder of FIG. 2 wherein a motor rotates the object holder. In this embodiment, shaft 701 is attached to the back support 201. The shaft is turned by a motor 702, such as a stepper motor, which selectively rotates the object holder circumferentially about axis 703. A second motor 704, also a stepper motor, is attached to the top art 202 and is connected to a first plate 705. An upper end of each support brace 204 is connected to the first plate. A lower end of each support brace 204 is connected to as second plate 706. The plates are configured to rotate about axis 707 so that the object held in the object holder can be circumferentially rotated. The controller operatively controls the motors so that the object and/or the object holder can be simultaneously selectively rotated as needed. The embodiment of FIG. 7 enables a position of the object to be fixed while the object holder is selectively rotated or a position of the object holder to be fixed while the object is selectively rotated. The identification tag 126 can be fixed any of the components.

It should be appreciated that the embodiments shown are for explanatory purposes and should not be viewed as limiting the scope of the appended claims strictly to those embodiments. Other embodiments are intended to fall within the scope of the appended claims.

Embodiments of Direct-To-Object Print Systems

What is also disclosed is a direct-to-object print system configured to use various embodiments of the object holder of the present invention.

Figure 8:
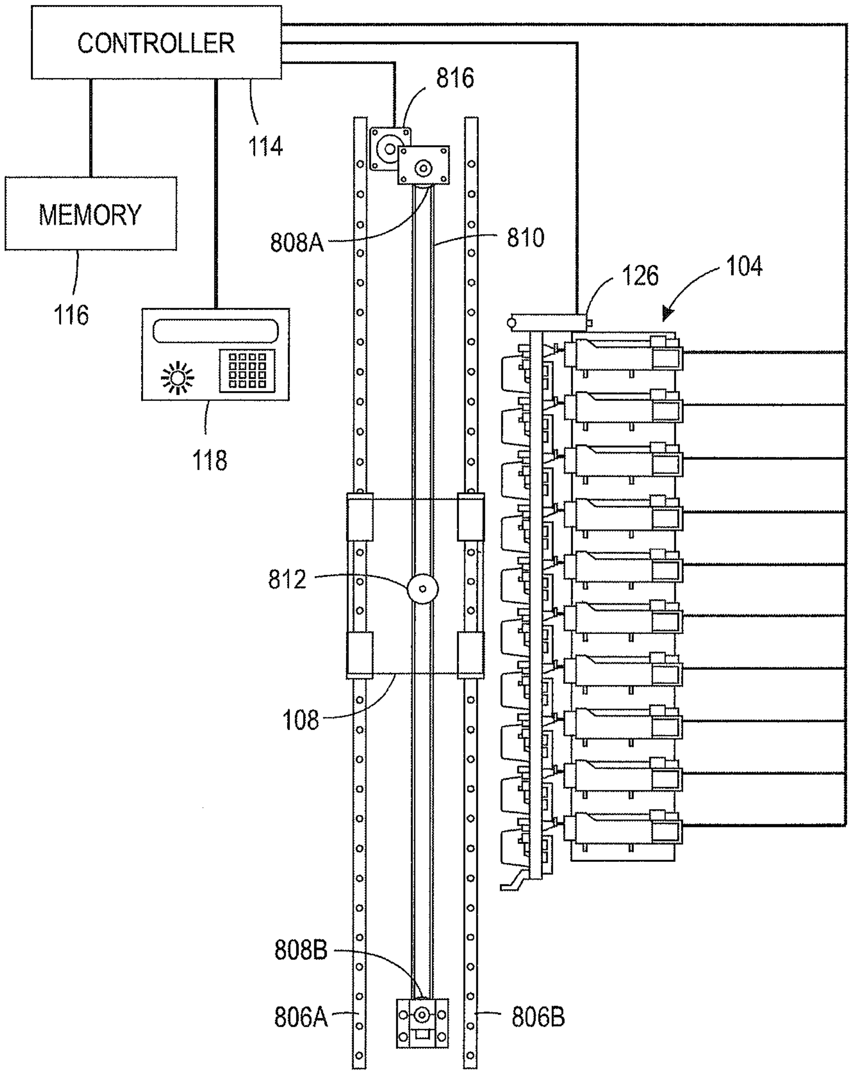
FIG. 8 shows an alternative embodiment of the direct-to-object print system of FIG. 1.

Reference is now being made to FIG. 8 which illustrates an alternative embodiment to the direct-to-object print system of FIG. 1 which uses a belt to move the object holder past the printheads. The support member comprises a pair of support members 806A and 806B about which the shuttle mount 108 is slideably attached. A pair of fixedly positioned pulleys 808A and 808B and a belt 810 form an endless belt entrained about the pair of pulleys, and a rotatable pulley 812 engages the endless belt to enable the third pulley to rotate in response to the movement of the endless belt moving about the pair of pulleys to move the object holder disclosed herein. The actuator 816 operatively rotates the drive pulley to move the endless belt about the pulleys. The controller 114 is configured to operate the actuator. The object holder of FIG. 1 has been omitted to show underlying components.

Figure 9:
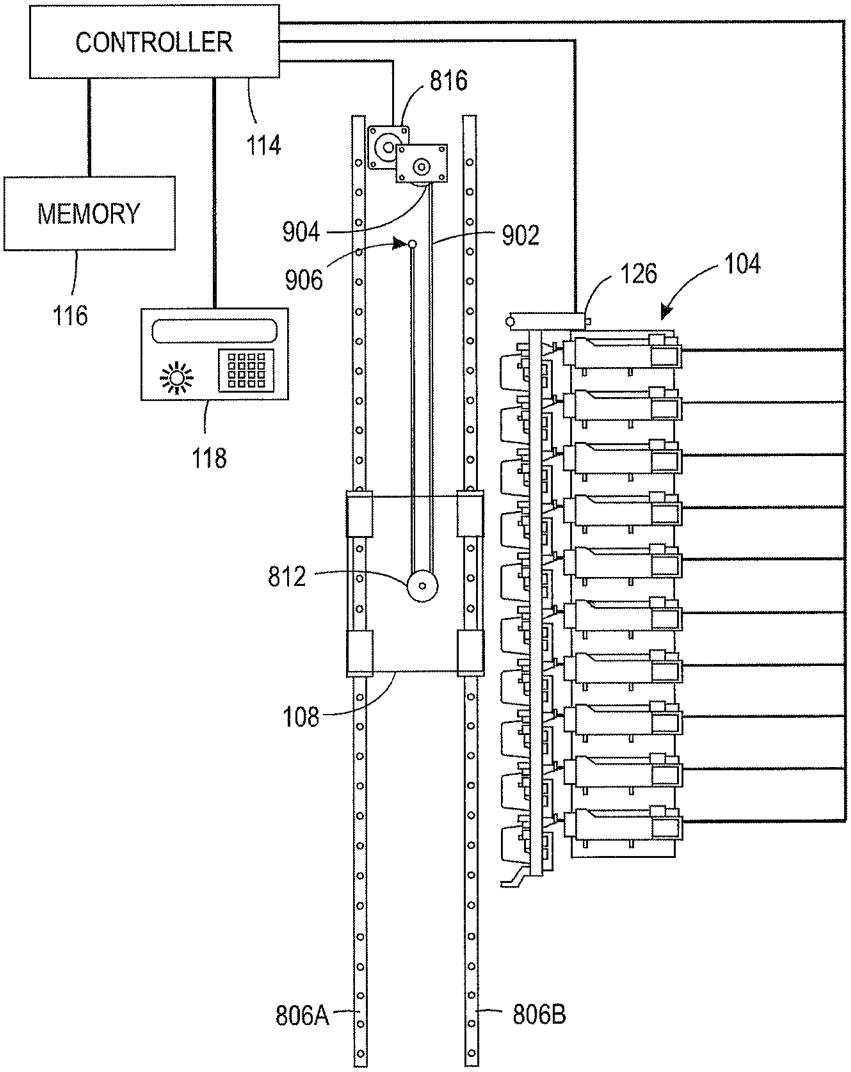
FIG. 9 shows another alternative embodiment of the direct-to-object print system of FIG. 1.

Reference is now being made to FIG. 9 which illustrates yet another embodiment of the direct-to-object print system of FIG. 1. One end of a belt 902 is operatively connected to a take-up reel 904 that is operatively connected to the actuator 816. The other end of the belt is positionally fixed at 906. The belt also engages a rotatable pulley 812 attached to the object holder. The support member comprises a pair of support members 806A and 806B about which the shuttle mount 108 is slideably attached. The actuator rotates the take-up reel to wind a portion of the length of the belt about the take-up reel to cause the object holder to move past the printheads. The actuator unwinds the belt from the take-up reel. The controller 114 is configured to operate the actuator. The object holder of FIG. 1 has been omitted to show underlying components.

Figure 10:
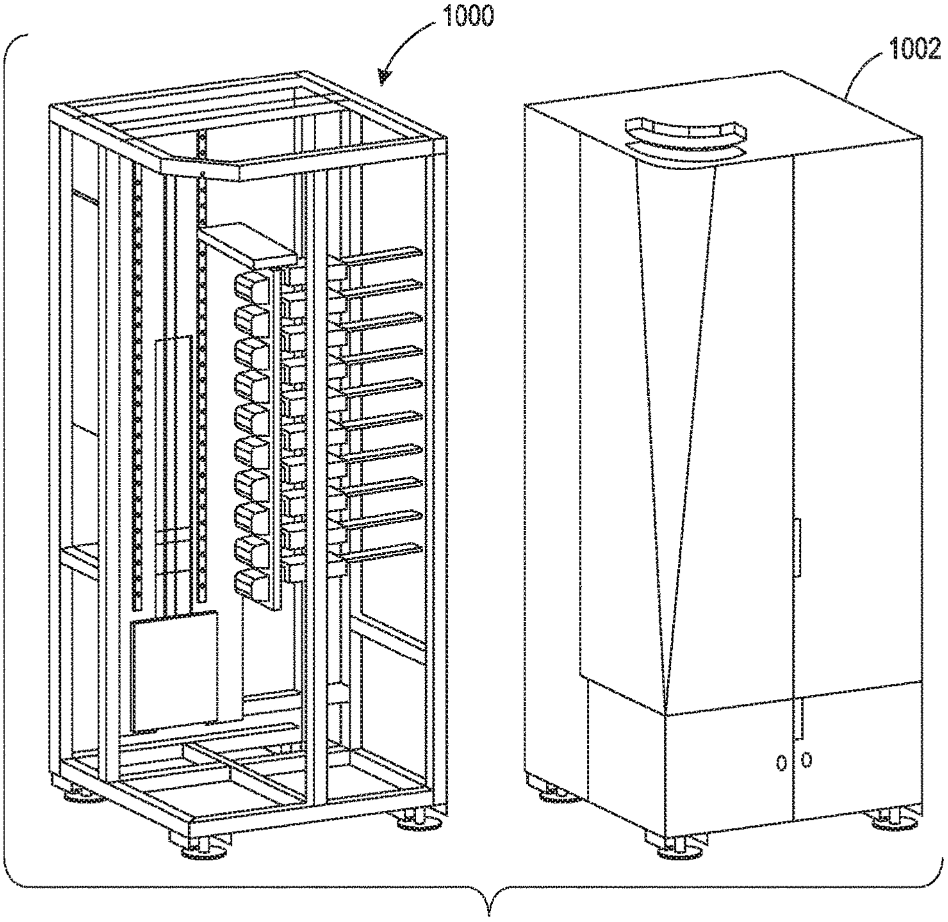
FIG. 10 show one embodiment of the present direct-to-object print system housed in a cabinet.

Reference is now being made to FIG. 10 which shows an embodiment of the present direct-to-object print system 1000 housed in a cabinet 1002. The object holder is omitted.

The direct-to-object print system disclosed herein can be placed in communication with a workstation, as are generally understood in the computing arts. Such a workstation has a computer case which houses various components such as a motherboard with a processor and memory, a network card, a video card, a hard drive capable of reading/writing to machine readable media such as a floppy disk, optical disk, CD-ROM, DVD, magnetic tape, and the like, and other software and hardware needed to perform the functionality of a computer workstation. The workstation further includes a display device, such as a CRT, LCD, or touchscreen device, for displaying information, images, classifications, computed values, extracted vessels, patient medical information, results, interim values, and the like. A user can view any of that information and make a selection from menu options displayed thereon. The workstation has an operating system and other specialized software configured to display alphanumeric values, menus, scroll bars, dials, slideable bars, pull-down options, selectable buttons, and the like, for entering, selecting, modifying, and accepting information needed for processing in accordance with the teachings hereof. The workstation can display images and information about the operations of the present direct-to-object print system. A user or technician can use a user interface of the workstation to set parameters, view/adjust/delete values, and adjust various aspects of various operational components of the present direct-to-object print system, as needed or desired, depending on the implementation. These selections or inputs may be stored to a storage device. Settings can be retrieved from the storage device. The workstation can be a laptop, mainframe, or a special purpose computer such as an ASIC, circuit, or the like.

Any of the components of the workstation may be placed in communication with any of the modules and processing units of the direct-to-object print system and any of the operational components of the present direct-to-object print system can be placed in communication with storage devices and computer readable media and may store/retrieve therefrom data, variables, records, parameters, functions, and/or machine readable/executable program instructions, as needed to perform their intended functions. The various components of the present direct-to-object print system may be placed in communication with one or more remote devices over network via a wired or wireless protocol. It should be appreciated that some or all of the functionality performed by any of the components of the direct-to-object print system can be controlled, in whole or in part, by the workstation.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the systems disclosed herein may be incorporated in an article of manufacture which may be shipped, sold, leased, or otherwise provided separately either alone or as part of a product suite or a service. The above-disclosed and other features and functions, or alternatives thereof, may be desirably combined into other different systems or applications.

Presently unforeseen or unanticipated alternatives, modifications, variations, or improvements may become apparent and/or subsequently made by those skilled in this art which are also intended to be encompassed by the following claims.

What is claimed is:

1. An object holder for retaining an object in a direct-to-object print system, the object holder comprising:
- a back support configured to slideably traverse a support member positioned parallel to a plane formed by at least one printhead of a direct-to-object print system;
- a top and bottom arm attached to the back support;
- at least two support braces each attached to the top and bottom arms; and
- at least one restraining bar slideably attached to the support braces so the bar can be lowered on the object between the top and bottom arms.

2. The object holder of claim 1, further comprising at least one spring attached at one end to the top arm and attached at another end to the restraining bar, the spring exerting a tension to help secure the object held in the object holder.

3. The object holder of claim 1, wherein the back support is adjustable to fit objects of different sizes.

4. The object holder of claim 3, wherein the adjustable back support comprises a threaded shaft for selectively adjusting a distance between the top and bottom arms to accommodate objects of different sizes.

5. The object holder of claim 1, wherein the restraining bar further comprises at least one set screw for locking the restraining bar to a support brace in a desired position.

6. The object holder of claim 1, wherein the restraining bar is shaped to conform to one end of the object.

7. The object holder of claim 1, wherein the object holder is attached to a shuttle mount configured to slideably traverse the support member.

8. The object holder of claim 7, wherein a position of the object is fixed and a motor rotates the object holder.

9. The object holder of claim 7, wherein a position of the object holder is fixed and a motor rotates the object.

10. A direct-to-object print system for printing on a surface of an object, the direct-to-object print system comprising:
- at least one printhead configured to eject marking material on to a surface of an object;
- a support member positioned parallel to a plane formed by the printhead;
- an object holder configured to slideably traverse the support member, the object holder comprising:
  - a back support and a top and bottom arm attached to the back support;
  - at least two support braces each attached to the top and bottom arms; and
  - at least one restraining bar slideably attached to the support braces so the bar can be lowered on the object between the top and bottom arms; and
- a controller configured to cause the printhead to eject marking material onto the object held by the object holder as the object passes the printhead.

11. The direct-to-object print system of claim 10, further comprising an actuator for operatively causing the object holder to slideably traverse the support member.

12. The direct-to-object print system of claim 11, further comprising a belt that contacts pulleys, one of the pulleys being operatively connected to the actuator which causes the pulley to move the belt about the pulleys and move the object holder past the printhead.

13. The direct-to-object print system of claim 12, wherein the belt is entrained about the pulleys to form an endless belt, further comprising an additional pulley that engages the endless belt to enable the additional pulley to rotate in response to a movement of the endless belt to move the object holder.

14. The direct-to-object print system of claim 10, wherein the support member is oriented to enable one end of the support member to be at a higher gravitational potential than another end of the support member.

15. The direct-to-object print system of claim 10, further comprising at least one spring attached at one end to the top arm and attached at another end to the restraining bar, the spring exerting a tension to help secure the object held in the object holder.

16. The direct-to-object print system of claim 10, wherein the back support is adjustable to fit objects of different sizes.

17. The direct-to-object print system of claim 16, wherein the adjustable back support comprises a threaded shaft for selectively adjusting a distance between the top and bottom arms to accommodate objects of different sizes.

18. The direct-to-object print system of claim 10, wherein the restraining bar further comprises at least one set screw for locking the restraining bar to a support brace in a desired position.

19. The direct-to-object print system of claim 10, wherein the restraining bar is shaped to conform to one end of the object.

20. The direct-to-object print system of claim 10, wherein the object holder is attached to a shuttle mount configured to slideably traverse the support member.

21. The direct-to-object print system of claim 20, wherein a position of the object is fixed and a motor rotates the object holder.

22. The direct-to-object print system of claim 20, wherein a position of the object holder is fixed and a motor rotates the object.

23. The direct-to-object print system of claim 10, further comprising an identification tag and an input device.

24. The direct-to-object print system of claim 23, wherein the identification tag comprises any of: a RFID tag containing an identifier and the input device is a RFID reader, a barcode containing an identifier and the input device is a barcode reader, and at least one mechanical feature and the input device is a biased arm that follows the mechanical features and converts a position of the arm into an electrical signal comprising an identifier.

25. The direct-to-object print system of claim 23, wherein the controller is further configured to:

receive the identifier from the input device;

compare the identifier to at least one identifier stored in a memory; and disable the actuator in response to the identifier failing to correspond to any of the identifiers stored in memory.

26. The direct-to-object print system of claim 23, wherein the controller is further configured to:

receive the identifier from the input device;

compare the identifier to identifiers stored in a memory; and disable operation of the printhead in response to the identifier failing to correspond to any of the identifiers stored in memory.

27. The direct-to-object print system of claim 10, wherein the controller is further configured to operate a user interface comprising any of: a display, a user input device, and an annunciator for emitting an audible sound.

28. The direct-to-object print system of claim 27, wherein the controller is further configured to:

detect a configuration of the printhead and ink supplied to the printhead; and communicate a message to the user interface, the message being any of: that ink needs to be changed, and that the printhead needs to be reconfigured.

29. The direct-to-object print system of claim 10, further comprising a sensor positioned to generate image data from one of: the object holder, the object, and a sheet of printed media, the controller being configured to receive the image data from the sensor and analyze the image data to identify any of: printhead alignment, image quality, and inoperative ejectors.

* * * * *